(12) United States Patent
Chappell

(10) Patent No.: US 8,558,150 B2
(45) Date of Patent: Oct. 15, 2013

(54) INERTIAL MEASUREMENT UNIT (IMU) MULTI-POINT THERMAL CONTROL

(75) Inventor: Charles D. Chappell, Treasure Island, FL (US)

(73) Assignee: Honeywell International Inc., Morristown, NJ (US)

( * ) Notice: Subject to any disclaimer, the term of this patent is extended or adjusted under 35 U.S.C. 154(b) by 498 days.

(21) Appl. No.: 12/628,447

(22) Filed: Dec. 1, 2009

(65) Prior Publication Data

US 2011/0127365 A1    Jun. 2, 2011

(51) Int. Cl.
| | |
|---|---|
| G01C 21/16 | (2006.01) |
| F42B 15/01 | (2006.01) |
| F41G 7/36 | (2006.01) |
| G01C 21/00 | (2006.01) |
| F42B 15/00 | (2006.01) |
| F41G 7/00 | (2006.01) |

(52) U.S. Cl.
USPC ............... 244/3.1; 73/488; 73/497; 701/400; 701/408; 701/500; 702/85; 702/99

(58) Field of Classification Search
USPC ........ 244/3.1, 75.1, 76 R, 175, 177; 342/350, 342/352, 357.2, 357.21, 357.22, 357.25, 342/357.31, 357.32, 357.39, 357.51, 342/357.62; 73/488, 497; 702/1, 2, 6, 9, 85, 702/99, 108, 117, 127, 130, 132, 141; 701/400, 408, 494, 495, 500, 501, 505, 701/506

See application file for complete search history.

(56) References Cited

U.S. PATENT DOCUMENTS

| | | | | |
|---|---|---|---|---|
| 4,303,978 | A * | 12/1981 | Shaw et al. | 701/506 |
| 5,297,028 | A * | 3/1994 | Ishikawa | 702/99 |
| 5,527,003 | A * | 6/1996 | Diesel et al. | 244/76 R |
| 5,603,570 | A * | 2/1997 | Shimizu | 702/99 |
| 5,799,904 | A | 9/1998 | Goodzeit et al. | |
| 5,805,403 | A * | 9/1998 | Chemla | 702/132 |
| 6,175,807 | B1 * | 1/2001 | Buchler et al. | 701/501 |
| 6,456,939 | B1 | 9/2002 | McCall et al. | |
| 6,480,152 | B2 * | 11/2002 | Lin et al. | 342/357.32 |
| 6,494,093 | B2 * | 12/2002 | McCall et al. | 73/497 |
| 6,516,283 | B2 * | 2/2003 | McCall et al. | 702/141 |
| 6,522,992 | B1 * | 2/2003 | McCall et al. | 702/141 |
| 6,577,952 | B2 * | 6/2003 | Geier et al. | 701/495 |
| 6,651,027 | B2 * | 11/2003 | McCall et al. | 702/141 |
| 6,671,648 | B2 * | 12/2003 | McCall et al. | 702/141 |
| 6,697,758 | B2 * | 2/2004 | McCall et al. | 702/141 |
| 6,778,908 | B2 * | 8/2004 | Martorana et al. | 702/9 |
| 6,987,399 | B2 * | 1/2006 | Lee | 702/130 |
| 7,003,399 | B1 | 2/2006 | Chappell | |
| 7,340,344 | B2 | 3/2008 | Chappell | |
| 7,366,613 | B2 | 4/2008 | DuBois et al. | |
| 7,698,064 | B2 * | 4/2010 | Chappell et al. | 701/500 |
| 2002/0008661 | A1 * | 1/2002 | McCall et al. | 342/357.14 |
| 2006/0054660 | A1 | 3/2006 | Chappell | |
| 2006/0058961 | A1 | 3/2006 | Chappell et al. | |

* cited by examiner

*Primary Examiner* — Bernarr Gregory
(74) *Attorney, Agent, or Firm* — Fogg & Powers LLC

(57) ABSTRACT

A thermally controlled gas bearing supported inertial measurement unit (IMU) system is provided. The system comprises a sensor assembly enclosing one or more sensors and a plurality of heating elements, wherein each of the plurality of heating elements is proximal to the sensor assembly. The system also comprises a plurality of temperature sensors configured to determine a temperature of a region of the sensor assembly and a control unit configured to adjust a temperature of at least one of the plurality of heating elements based on feedback from the at least one temperature sensor.

12 Claims, 4 Drawing Sheets

INERTIAL MEASUREMENT UNIT (IMU) MULTI-POINT THERMAL CONTROL

GOVERNMENT LICENSE RIGHTS

The U.S. Government may have certain rights in the present invention as provided for by the terms of Government Contract No. FA9453-08-C-0162.

BACKGROUND

Inertial navigation systems (INSs) are used in civil and military aviation, missiles and other projectiles, submarines and space technology as well as a number of other vehicles. An INS measures the position and attitude of a vehicle by measuring the accelerations and rotations applied to the INS's inertial frame. An INS may consist of an inertial measurement unit (IMU) combined with control mechanisms, allowing the path of a vehicle to be controlled according to the position determined by the INS. An IMU comprises a sensor assembly that contains sensitive instruments for position monitoring. The greater the accuracy of the sensitive instruments, the greater the accuracy of the position data determined by the IMU. Maintaining a nearly constant and stable temperature of the IMU improves its accuracy during calibration and flight operation, as temperature stability is directly related to sensor accuracy.

In a rotational sensor assembly supported by gas bearing pads, removing heat from the sensor assembly and controlling the temperature gradient across the sensor assembly improves the accuracy of the IMU. Uneven heat sources inside the sensor assembly cause variable temperatures on the surface of the sensor assembly. A current method of maintaining thermal stability heats the gas supplied to the gas bearing pads with a single in-line heater that supplies the entire complement of gas bearing pads. However, the slow flow rate of the gas in the gas line provides an excessive delay in thermal response and allows unspecified heat to enter or leave the system. Maintaining thermal control that accounts for changes in rotational position of the IMU would improve accuracy.

SUMMARY

One exemplary embodiment is directed to a thermally controlled gas bearing supported inertial measurement unit (IMU) system. The system comprises a sensor assembly enclosing one or more sensors and a plurality of heating elements, wherein each of the plurality of heating elements is proximal to the sensor assembly. The system further comprises a plurality of temperature sensors configured to determine a temperature of a region of the sensor assembly and a control unit configured to adjust a temperature of at least one of the plurality of heating elements based on feedback from the at least one temperature sensor.

DRAWINGS

Like reference numbers and designations in the various drawings indicate like elements.

DETAILED DESCRIPTION

Thermal control of a rotational gas bearing supported sensor assembly of an inertial measurement unit (IMU) guidance system is provided. IMUs are typically installed in a vehicle for navigational purposes and the accuracy of the IMU affects the performance of the entire vehicle. The IMU is more accurate when its temperature is controlled. Therefore, improving thermal control of the IMU improves its functionality and leads to improved vehicle performance.

In a gas bearing supported sensor assembly, control of the gas temperature is difficult due to the slow flow rate of the gas. In one embodiment, the temperature of the gas is controlled such that the gas aids in reducing the temperature gradient of the sensor assembly, for example by sinking heat from the surface of the sensor assembly or warming cooler regions of the sensor assembly. The temperature gradient may have a larger effect on the accuracy of the IMU than its overall temperature does. Higher or lower temperature zones on the surface of the sensor assembly could be heated or cooled accordingly to reduce overall temperature changes and gradients across the surface.

Figure 1:
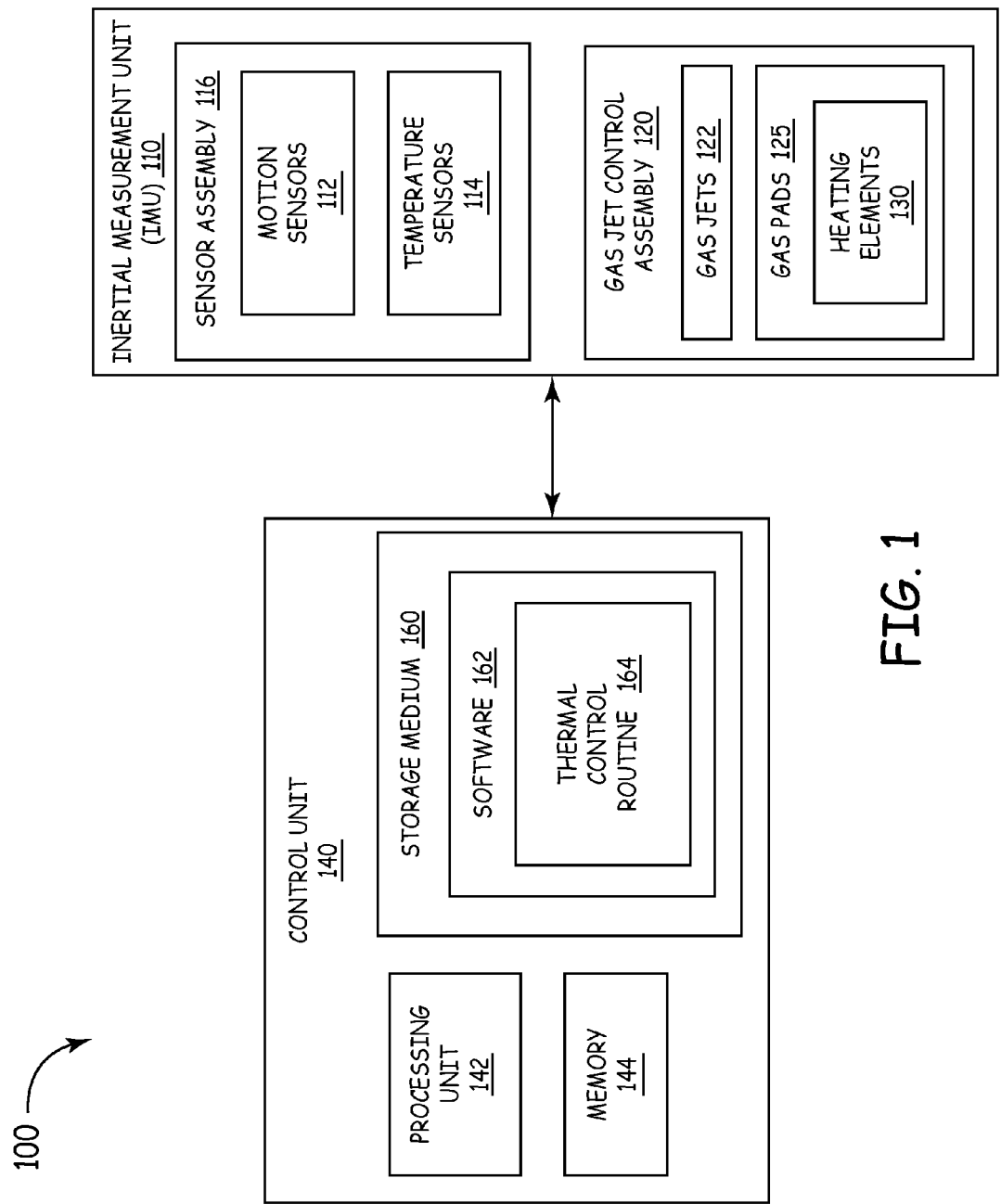
FIG. 1 is a block diagram of one embodiment of an inertial navigation system (INS).

FIG. 1 is a block diagram of one embodiment of an inertial navigation system (INS) 100. The INS 100 reduces the temperature gradient of an inertial measurement unit (IMU) 110 and determines location and navigation information. The INS 100 comprises a control unit 140 and the IMU 110. The IMU 110 comprises a sensor assembly 116 and a gas jet control assembly 120. The sensor assembly 116 contains motion sensors 112 and temperature sensors 114. The sensor assembly 116 is an approximately spherical hollow ball for mounting the sensors 112 and 114. The sensor assembly 116 protects the sensors 112 and 114 from environmental effects that could degrade the performance of the sensors 112 and 114, such as vibrations, radiation, and the like. In one embodiment, the motion sensors 112 are accelerometers, gyroscopes or any other suitable sensor. In an alternative embodiment of the INS, the sensor assembly 116 is shaped like a cylinder or any other suitable shape. The sensor assembly 116 comprises aluminum, or any other suitable material.

The accuracy of the motion sensors 112 depends on temperature stability. Therefore, a more precise control over the temperature of the motion sensors 112 will improve performance of the sensors 112. In embodiments where the IMU 110 is installed in a vehicle, such as an aircraft or projectile, thermal control of the motion sensors 112 improves the position information provided to the vehicle. The temperature sensors 114 determine the temperature of the IMU 110. In particular, the temperature sensors 114 determine the temperature of the sensor assembly 116 at various zones or regions of its surface. Theses temperatures are used in a feedback loop to control the temperature of the IMU 110.

The gas jet control assembly 120 provides rotation of the sensor assembly 116 when calibrating the instruments (including the sensors 112 and 114) embedded within the sensor assembly 116. The gas jet control assembly 120 provides rotational control without the use of conventional torque motors by utilizing a plurality of directed gas jets 122. In other words, the gas jets 122 can rotate the sensor assembly 116 in all directions. The gas jets 122 are substantially stationary relative to the INS 100. The gas jets 122 suspend the sensor assembly 116 in gas creating a substantially frictionless environment (due to a thin film of pressurized air that serves as the interface between the surfaces of the IMU and the gas pads) and control the angular position of the sensor assembly 116 without physically touching or being attached to the sensor assembly 116.

The gas jets 122 comprise gas pads 125 (also referred to as air pads or air bearing pads) that output the gas to sensor assembly 116. Rotation of the sensor assembly 116 is accomplished through applying pressurized gas to each gas pad 125 such that a small gap is created between the sensor assembly 116 and the gas pads 125. Examples of the type of gas used by the gas jet control assembly 120 include air, nitrogen, or the like. In one embodiment, the gas pads 125 are substantially evenly spaced around the sensor assembly 116. In another embodiment, the gas pads 125 form pairs of opposing gas pads 125 spaced around the sensor assembly 116 in such a way as to enable rotation and floatation of the sensor assembly 116. Other suitable arrangements of gas pads 125 are contemplated.

In the embodiment of FIG. 1, heating elements 130 are located on at least one of the gas pads 125. As used herein, heating elements 130 refers generally to devices that can be warmed or cooled. However, for clarity of illustration, the specific embodiments described herein are drawn to heating elements that warm. It is to be understood that elements that cool can be substituted for some or all of the elements that warm in the described embodiments. Such a substitution is within the capabilities of one of ordinary skill in the art.

In one implementation, a heating element 130 is affixed to each gas pad 125. The control unit 140 controls the heating elements 130 individually or in groups based on feedback from the temperature sensors 114. Locating the heating elements 130 on the gas pads 125 eliminates thermal delay due to a slow gas flow rate and keeps the temperature of the gas near the surface of the sensor assembly 116 at the desired temperature more accurately. Having the heating elements 130 at the gas pads 125 provides multi-point thermal control.

In another embodiment of the multi-point thermally controlled IMU 110, heating elements 130 are located proximal to the sensor assembly 116 but not necessarily on the gas pads 125. For example, the heating elements 130 could be located at various points near the sensor assembly 116 without being located on the gas pads 125, such as located on an independent support structure, or on a hose that supplies gas to the gas pads 125. As discussed herein, proximal is any suitable distance within which the heating elements 130 would affect the temperature of the sensor assembly 116.

The control unit 140 uses a thermal control routine 164 to control the temperature of the IMU 110. The control unit 140 comprises a processing unit 142, a memory 144, and a suitable storage device or medium 160. The processing unit 142 may be any suitable processor, such as a microprocessor or the like. Software 162 comprises program instructions for the thermal control routine 164 that are stored on storage medium 160 and executed by the processing unit 142. The thermal control routine 164 determines how much heat should be applied at each heating element 130 in order to maintain the sensor assembly 116 at a nearly constant temperature. That is, a thermal gradient across the sensor assembly 116 is substantially maintained within a predetermined temperature range. Data inputs to the thermal control routine 164 include data from the temperature sensors 114 (that is, the temperature values themselves or related data) and position information of the angular displacement of the sensor assembly 116 relative to the gas pads 125. In one embodiment, the thermal control routine 164 directly reads the temperature values determined by the temperature sensors 114. Wiring connects the control unit 140 to the heating elements 130 and the IMU 110. In one embodiment, the control unit 140 is designed such that a channel for each heating element 130 is created.

The IMU 110 typically has to undergo calibration to maintain its accuracy. For example, if the IMU 110 is installed in a missile, it is advisable that the IMU 110 maintains a certain level of accuracy while the missile is stored, which can be up to decades. Calibration is accomplished by rotating the sensor assembly 116 and verifying the readings from the embedded sensors 112 at different positions against known values. The sensor assembly 116 is rotated in a certain pattern of motion in order to calibrate it. The pattern may consist of rotating the sensor assembly 116 in a series of positions, staying in each position for a period of time, and then repeating the series. Therefore, if the sensor assembly 116 is in a first position and gets thermally stabilized, when the sensor assembly 116 is rotated into a second position, the position of the gas pads 125 relative to any hot or cold spots on the sensor assembly 116 changes. This causes the temperatures of different regions of the sensor assembly 116 to change based on the region's exposure to the gas. Therefore, the temperature of the gas applied to the regions of the sensor assembly 116 can be adjusted to compensate for the physical changes of the hot and cold spots relative to the gas pads 125.

The heat load at each gas pad 125 varies due to rotational position of the sensor assembly 116. Due to this rotation, higher temperature zones or lower temperature zones on the surface of the sensor assembly 116 move closer to, or further from, gas pads 125. By actively controlling the temperature of each heating element 130, good resolution of thermal control is achieved and will reduce the difference in temperature across the entire surface area of the sensor assembly 116 whether it is stationary or rotating in any position or direction. The thermal control routine 164 uses active feedback control to control the heating elements 130. The thermal control routine 164 processes its input data (which can include, for example, determining how fast the heat changes and how the position of the sensor assembly 116 has moved relative to the gas pads 125) and applies a signal with the correct gain to a heater driver for each of the heating elements 130. This method will reduce the thermal gradient on the sensor assembly 116. In another embodiment, the temperature of the heating elements 130 is manually controlled.

Suitable storage devices or media 160 include, for example, forms of non-volatile memory, including by way of example, semiconductor memory devices (such as erasable programmable read only memory (EPROM), electrically erasable programmable read only memory (EEPROM), and flash memory devices), magnetic disks (such as local hard disks and removable disks), and optical disks (such as CD-ROM disks). Moreover, the storage device or media 160 need not be local to the INS 100. Typically, a portion of the software 162 executed by the processing unit 142 and one or more data structures used by the software 162 during execution are stored in the memory 144. Memory 144 comprises, in one implementation of such an embodiment, any suitable form of random access memory (RAM) now known or later developed, such as dynamic random access memory (DRAM). In other embodiments, other types of memory are used. The components of the control unit 140 are communicatively coupled to one another as needed using suitable interfaces and interconnects.

One embodiment of the inertial navigation system 100 comprises 32 gas pads 125. In other embodiments, 8 or 16 gas pads 125 are used. In differing embodiments, different numbers of gas pads 125 have heating elements 130 located thereon. In some embodiments, all of the gas pads 125 comprise a heating element 130. In alternate embodiments, the diameter of the sensor assembly 116, includes but is not limited to diameters ranging between approximately 8 inches to approximately 13 inches.

Figure 2:
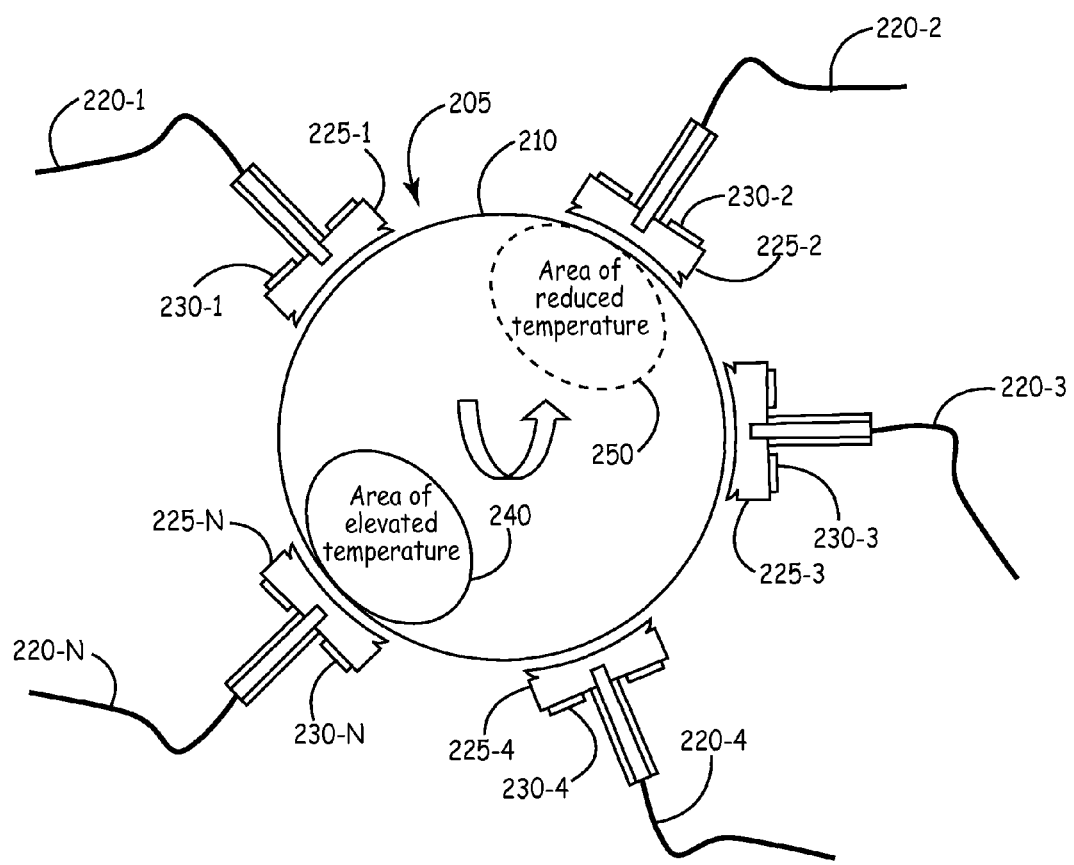
FIG. 2 is a diagram of one embodiment of a gas bearing supported inertial measurement unit (IMU) with thermal control.

FIG. 2 is a diagram of one embodiment of a gas bearing supported inertial measurement unit (IMU) 205 with thermal control. The IMU 205 comprises a sensor assembly 210 and sensors internal to the sensor assembly 210. The IMU 205 also comprises gas pads 225-1 through 225-N (referred to herein as gas pads 225) that support the sensor assembly 116 in a near frictionless environment by applying pressurized gas to the sensor assembly 116 delivered to the gas pads 225 by pressure hoses 220-1 through 220-N. The gas pads 225-1 to 225-N each have a heating element 230-1 to 230-N (referred to herein as heating elements 230) affixed thereto, respectively.

The gas pads 225 typically comprise a porous material such that the pressurized gas seeps out of the pad very slowly. In other words, the gas pads 225 act more like an air stone in an aquarium rather than an air hose that blows rapidly. Due to this slow nature of the gas flow, locating a heater at the gas source rather than near the IMU 205 may be impractical. Gas heated at its source, or somewhere else in the airflow, is likely to lose heat by the time it reaches the IMU 205. By the time the gas reaches the gas pads 225, it could achieve thermal equilibrium with the environment. Additionally, with only a single heated gas source, the IMU 205 could only get hotter or colder, affecting the overall temperature instead of reducing the thermal gradient. Therefore, because the gas flows slowly out of the air pads 225, locating the heating elements 230 on the gas pads 225, or somewhere proximal to or within the IMU 205 (such as for example, proximal to the sensor assembly 116), ensures the gas reaching the surface of the sensor assembly 210 will be warmer relative to the environment and improves the reaction time of temperature changes. Also, having multi-point heating by locating heating elements 230 near the sensor assembly 116 (for example, on the gas pads 225) provides fidelity to change the gas temperature higher and lower at different positions around the IMU 205.

The IMU 205 varies in heat load due in part to variations in and the location electronics located inside the sensor assembly 210, potential cooling or heating from the gas pads 225, and the environment. For example, in one implementation, 50 Watts of power inside the IMU 205 outputs heat. The thermal gradient of the IMU 205 may be reduced by cooling or warming the sensor assembly 210. The more uniformly the sensor assembly 116 is cooled or warmed, the more accurate its sensor outputs will be. The temperature at which the sensor assembly 210 is kept near is determined based on the functionality of the sensors (in other words, a temperature is selected typically for sensor performance, but is not limited to that consideration). In one embodiment, the thermal gradient is approximately maintained to not exceed a predetermined temperature range. For example, the thermal gradient is substantially kept within 5 degrees Fahrenheit (F). In other embodiments, the thermal gradient of the sensor assembly 210 is approximately maintained within other predetermined temperature ranges.

FIG. 2 provides an illustration of a thermal gradient of the IMU 205 that can be reduced using the heating elements 230. The sensor assembly 210 has an area of elevated temperature 240 and an area of reduced temperature 250 relative to the rest of the surface of the sensor assembly 210. The area of elevated temperature 240 may be resultant from, for example, a sensor outputting waste heat proximate to the area 240. The area of reduced temperature may be resultant from, for example, not having a sensor proximate to that area and being cooled by the gas from a gas pad 225 proximate to the area 250.

The area of elevated temperature 240 is proximate to the gas pad 225-N. Because this area 240 is hotter than the surrounding regions, cooling the area 240 would reduce the thermal gradient. Therefore, the heat applied to the gas from heating element 230-N should be lessened. This can be done, for example, by decreasing the power provided to the heating element 230-N. Similarly, the area of reduced temperature 250 needs to be heated and is proximate to the gas pad 225-2. The amount of heat outputted by the heating element 230-2 would be increased in order to heat up the area of reduced temperature 250. This reduces the thermal gradient of the sensor assembly 210.

Figure 3:
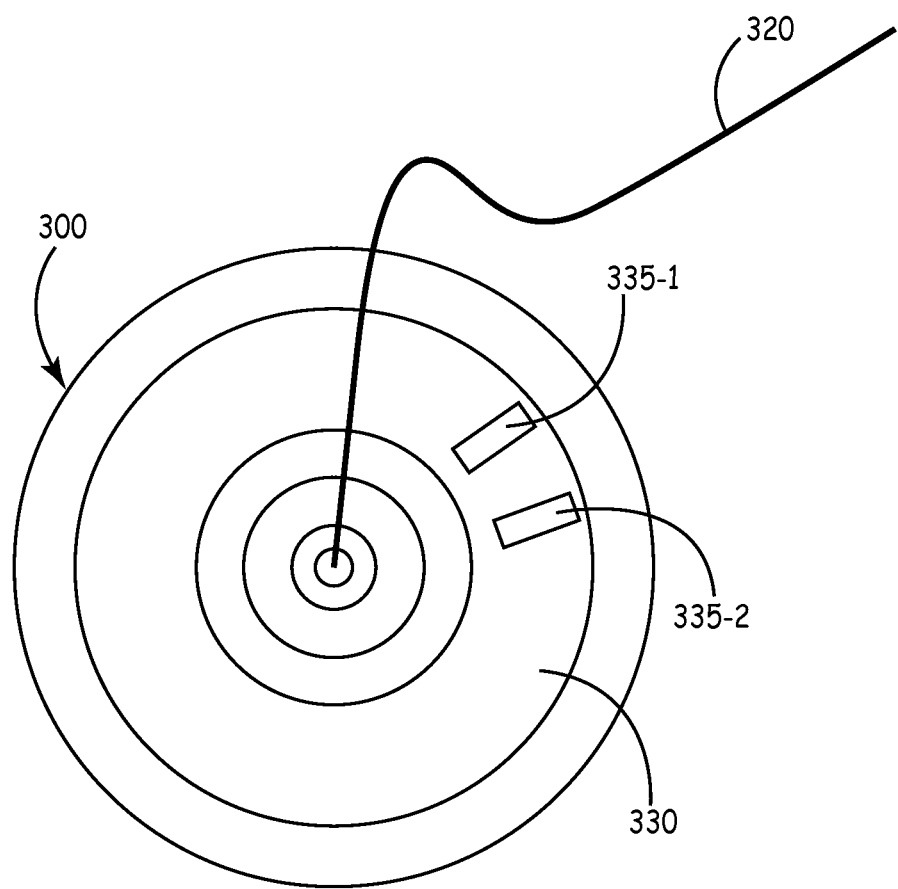
FIG. 3 is a diagram of one embodiment of a heating element attached to a gas pad.

FIG. 3 is a diagram of one embodiment of a heating element 330 attached to a gas pad 300. In this particular embodiment, the heating element 330 is an annular ring but may be any other shape conducive for attaching to the gas pad 300. The heating element 330 comprises an electrically resistive material affixed (for example, glued or by any other suitable means) onto the gas pad 300. Electrical leads 335-1 and 335-2 provide electrical power to the heating element 330. A high pressure gas input 320 provides gas to the gas pad 300. Adjusting the voltage or the resistance of the heating element 330 adjusts the heat output. In one embodiment, the heating element 330 has a signal resistance value of 1 to 10 Watts, calculated to get 28 volts. However, any appropriate resistance or voltage could be used.

In one embodiment, the heating element 330 is affixed to the side of the gas pad 300 located furthest away from an IMU. In another embodiment of the gas pad 300, the heating element 330 is located around the edge of the gas pad 300, such that the heating element 330 is perpendicular relative to the surface of the IMU.

Alternative embodiments of the heating element 330 include redundant coils, small traces in a material (such as a flexible, micro-material with a certain resistivity per inch). In one embodiment, the heating element 330 makes a zig zag pattern with a certain width and length. Another embodiment, especially for a digital signal, includes several different coils on one gas pad 300, where a single coil or a group of coils is turned on or off to change the heat output.

Figure 4:
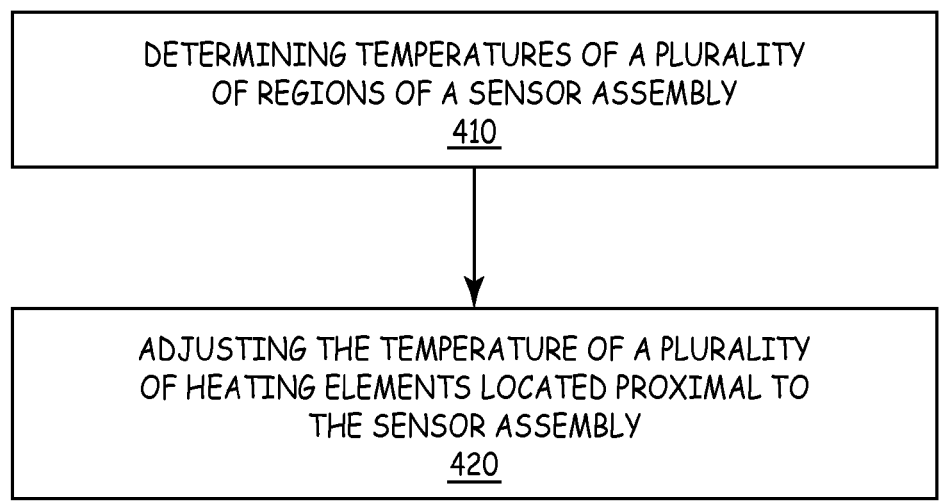
FIG. 4 is a flowchart of one embodiment of a method of maintaining an IMU within a predetermined thermal gradient.

FIG. 4 is a flowchart of one embodiment of a method 400 of maintaining an IMU within a predetermined thermal gradient. The method 400 begins with determining temperatures of a plurality of regions of an inertial measurement unit or the sensor assembly of the IMU (block 410). This may include detecting relatively warmer and relatively cooler regions of the IMU.

The temperature of a plurality of heating elements positioned proximal to the IMU is adjusted based on the temperatures of the plurality of regions of the IMU (block 420). The temperature output of the plurality of heating elements is adjusted to maintain thermal stability of the IMU within a predetermined temperature range. A control unit maintains the predetermined temperature range using feedback from the temperature sensors. Ways of adjusting the temperature of the heating elements include increasing or decreasing electrical power supplied to the heating elements. In one embodiment, adjusting the temperature of the heating elements comprises raising the temperature of a heating element proximate to a relatively cooler region and lowering the temperature of a heating element proximate to a relatively warmer region.

Various additional acts can be performed to the method described above. For example, the angular position of the IMU can be determined. This enables a thermal control routine to determine where any warmer or cooler regions are with respect to the gas pads. In one embodiment of a method of maintaining thermal stability of the IMU, the IMU is rotated to reposition a warmer region further away from the plurality of heating elements or to reposition a cooler region closer to one of the plurality of heating elements. Additionally, whenever the IMU undergoes a rotation (for example, during calibration), the temperatures of the plurality of regions of the IMU are again determined. Based on the plurality of regions now proximate to the heating elements, the temperature of the heating elements is further adjusted.

By actively controlling the power applied to each heating element on each air pad, good resolution of thermal control is achieved and will minimize the difference in temperature across the entire surface area of the sensor assembly whether it is stationary or rotating in any position or direction. Difficulties in reducing the thermal gradient due to the physical position of the heat loads inside the IMU are overcome by locating heating elements proximal to the IMU.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A thermally controlled gas bearing supported inertial measurement unit (IMU) system, comprising:
    a sensor assembly enclosing one or more sensors;
    a plurality of heating elements, wherein each of the plurality of heating elements is proximal to the sensor assembly;
    a plurality of temperature sensors configured to determine a temperature of a region of the sensor assembly; and
    a control unit configured to adjust a temperature of at least one of the plurality of heating elements based on feedback from the at least one temperature sensor.

2. The system of claim 1, wherein a control unit configured to adjust a temperature of at least one of the plurality of heating elements based on feedback further comprises adjusting the temperature of at least one of the plurality of heating elements to substantially maintain a thermal gradient across the sensor assembly within a predetermined temperature range.

3. The system of claim 1, wherein a control unit configured to adjust a temperature of the plurality of heating elements based on feedback is further configured to:
    increase the temperature of a heating element proximate to a relatively cooler region; and
    decrease the temperature of a heating element proximate to a relatively warmer region.

4. The system of claim 1, further comprising:
    a plurality of gas pads that float the sensor assembly, each of the plurality of heating element is mounted on one of the plurality of gas pads.

5. The system of claim 4, further comprising:
    wherein the plurality of gas pads are positioned substantially evenly around the sensor assembly;
    wherein the plurality of heating elements comprises annular heating elements, wherein each annular heating element is affixed to one of the sixteen gas pads; and
    wherein the temperature of the sensor assembly at any given point is substantially maintained within 5 degrees Fahrenheit.

6. The system of claim 4, wherein each of the plurality of heating elements is annular in shape and is affixed to a backside of one of the plurality of gas pads.

7. The system of claim 4, wherein at least one of the plurality of gas pads comprises a porous material.

8. The system of claim 1, further comprising:
    wherein the control unit is further configured to rotate the sensor assembly based on maintaining an approximately stable temperature of the sensor assembly.

9. The system of claim 1, wherein the control unit controls each of the plurality of heating elements individually.

10. An inertial navigation system (INS) onboard an aerial vehicle, comprising:
    an inertial measurement unit (IMU) comprising:
        a sensor assembly, wherein the sensor assembly is approximately spherical in shape;
        at least one motion sensor; and
        a plurality of temperature sensors;
    a gas jet control assembly, comprising:
        a plurality of gas pads that output pressurized gas to support the sensor assembly, wherein the sensor assembly is free to rotate; and
        a plurality of heating elements, wherein each of the plurality of heating element is affixed to one of the plurality of gas pads, wherein the plurality of heating elements warm the pressurized gas; and
    a control unit configured to adjust the temperature of each of the plurality of heating elements based on the relative temperature of the surface of the sensor assembly proximate to the plurality of heating elements, wherein the control unit comprises:
        a processing unit configured to execute a thermal control routine to control the temperature of the sensor assembly.

11. The INS of claim 10, further comprising:
    wherein the aerial vehicle is a missile;
    wherein the at least one motion sensor comprises three accelerometers; and
    wherein the gas pads are configured to enable rotation of the sensor assembly.

12. The INS of claim 10, further comprising:
    wherein the control unit that is configured to adjust the temperature of the heating elements is further configured to:
        increase power provided to a heating element proximate to a relatively cooler region of the sensor assembly; and
        decrease power provided to a heating element proximate to a relatively warmer region of the sensor assembly; and
    wherein the thermal control routine controls the temperature of the sensor assembly by maintaining a thermal gradient across the sensor assembly substantially within a predetermined temperature range.

* * * * *